United States Patent Office 3,828,097
Patented Aug. 6, 1974

3,828,097
PROCESS FOR THE PREPARATION
OF CHLOROUS ACID
Joseph Callerame, Rochester, N.Y., assignor to Chemical Generators, Inc., Rochester, N.Y.
No Drawing. Filed Oct. 27, 1972, Ser. No. 301,329
Int Cl. C01b 11/02, 11/08
U.S. Cl. 423—472
6 Claims

ABSTRACT OF THE DISCLOSURE

A process of preparing chlorous acid is disclosed. An aqueous solution of the chlorate of an alkali metal or alkaline earth metal and the nitrate of an alkali metal or alkaline earth metal is flowed through a cation exchange resin, the active sites of which are occupied by hydrogen. The eluate is in the form of a chlorous acid solution.

BACKGROUND INFORMATION AND PRIOR ART

Chlorine dioxide is of considerable industrial importance and has found use in the bleaching of wood pulp, fats, oils and flour. Generally, chlorine dioxide is used as a bleaching agent and for removing undesirable tastes and odors from water and the like liquids. More recently it has been used as an anti-pollutant. For several of the established uses of the chlorine dioxide, it is desirable to produce the gas in situ so that the chlorine dioxide, upon formation, can be directly put to use either in gaseous form or, after absorption, in the form of an aqueous solution. In many instances, the use of chlorine dioxide in solution rather than in gaseous form is preferred. Since chlorine dioxide absorbed in water forms chlorous acid, from which the gas can be readily expelled by heating, chlorine dioxide in water and chlorous acid are for all practical purposes the same thing.

Accordingly, it is the primary object of the present invention to provide for a procedure by means of which chlorine dioxide or chlorous acid is selectively produced in situ.

SUMMARY OF THE INVENTION

In accordance with the invention it has been ascertained that chlorous acid is formed if ion exchange contact is established between a cation exchange resin in the hydrogen form and an aqueous solution of the chlorate of an alkali metal or alkaline earth metal and the nitrite of an alkali metal or alkaline earth metal. The eluate comprises an aqueous solution of chlorous acid which, upon heating, expels chlorine dioxide in gaseous form.

The nature of the cation exchange resin is not critical, and any commercially available resin of this nature may be used. Generally, a strongly acid type cation exchange resin should be used. Experiments have indicated that resins marketed under the trade name "Ionac" of mesh 16–30 and whose active sites are occupied by hydrogen are particularly suitable. The experiments hereinafter described were carried out with an "Ionac" cation exchange resin marketed under the designation C–257.

Since both alkali metal and alkaline earth metal chlorates and alkali metal and alkaline earth metal nitrites are readily water soluble, no difficulties are encountered in preparing the aqueous solution. The concentration of the solution is thus merely limited by the solubility of the two reagents.

Although applicant does not wish to be limited by any theories advanced by him, it is reasonably assumed that the formation of the chlorous acid proceeds according to one of the two following reaction schemes (A) or (B), wherein the chlorate is in the form of sodium chlorate while the nitrite is in the form of sodium nitrite, the reference to hydrogen in ionic form indicating the hydrogen which occupies the active sites of the cation exchange resin.

(A) Total: 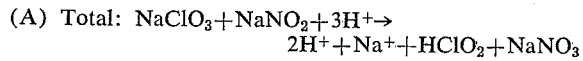

(1) 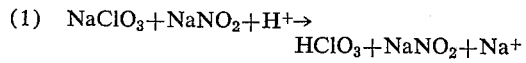

(2) 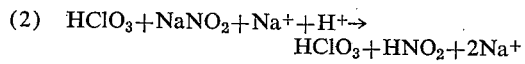

(3) 

Although the reaction scheme as expressed is theoretical, it suggests that chloric acid is intermediarily formed, which chloric acid reacts with nitrous acid in the presence of hydrogen ion to form the desired chlorous acid and a nitrate. The reaction proceeds correspondingly with other alkali metal chlorates or nitrites. The same applies to alkaline earth metal chlorates and nitrites.

(B) Total: 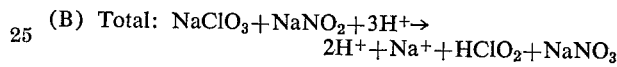

(1) 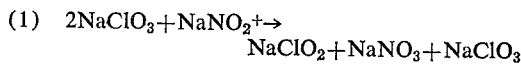

Ion exchange (2) 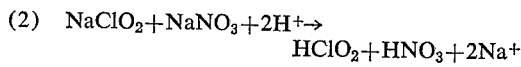

(3) 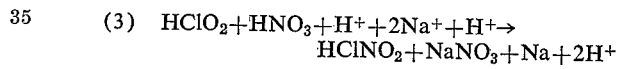

According to this theoretical reaction scheme, the basic reaction seems to be that $NaNO_2 + NaClO_3$ yields $NaClO_2$ which exchanges with the cation resin to form $HClO_2$.

The best yields are obtained if the pH value of the aqueous solution is between about 4–9. Since the pH of the aqueous solution normally is relatively strongly alkaline, adjustment to the desired pH range by addition of a suitable acid should preferably be carried out. Suitable acids are, for example, sulfuric acid, nitric acid, phosphoric acid, muriatic acid and the like.

It is also recommended to carry out the procedure within a temperature range of about between 37 and 90° C. since this results in the highest yield.

The invention will now be described by several examples, it being understood that these examples are given by way of illustration and not by way of limitation and that many changes may be effected without affecting in any way the scope and spirit of the invention as recited in the appended claims.

EXAMPLE 1

Five grams of $NaClO_3$ and 5 grams of $NaNO_2$ were mixed with 100 ml. of water. The aqueous solution thus obtained was passed through a cation exchange column. The resin of the column was "Ionac" C–257 and the active sites of the resin were occupied by hydrogen. The eluate was collected at the bottom of the column by gravity and measured for its contents. By standard comparative curves, it was established that the eluate contained 2.7 grams of chlorous acid, 1 gram of $NaClO_3$ and 0.5 grams of $NaClO_2$ as well as 4.6 grams of $NaNO_3$. Free chlorine could not be detected in the eluate. Free chlorine dioxide can be obtained from the eluate by heating. If it is desired to recover the chlorous acid in pure form, to wit, if it is to be separated from the other ingredients of the eluate, this, of course, can be accomplished by standard separation techniques well known in the art.

The above experiment was repeated by replacing the sodium chlorate with potassium chlorate $KClO_3$. A third experiment was carried out with calcium chlorate $$(Ca(ClO_3)_2)$$

instead of sodium or potassium chlorate. Equivalent results were obtained. In other words, in each experiment, a chlorous acid yield of 48 to 52% by weight was obtained.

EXAMPLE 2

The experiment of Example 1 was repeated, but prior to passing the aqueous solution through the cation exchange column, the pH of the aqueous solution, to wit, the nitrite-chlorate solution was adjusted by the addition of a suitable acid. It was found that the nature of the acid is not of any consequence and that any suitable acid may be used. In the experiments hereinafter described, muriatic, sulfuric, nitric or phosphoric acids were used. The following Table indicates the correlation between the pH value and the yield in percent by weight.

|  | pH | Percent yield | |
|---|---|---|---|
|  |  | High | Low |
| No pH adjustment | 9.0 | 52 | 48 |
|  | 8.5 | 54 | 50 |
|  | 8.0 | 55 | 51 |
|  | 7.5 | 63 | 60 |
|  | 7.0 | 80 | 72 |
|  | 6.5 | 93 | 90 |
|  | 6.0 | 96 | 93 |
|  | 5.5 | 97 | 97 |
|  | 5.0 | 97 | 97 |
|  | 4.5 | 97 | 97 |
|  | 4.0 | 97 | 97 |

As is clearly apparent from the Table, the yield increases with more acidic pH values. However, pH values below 4.0 should be avoided since otherwise the chlorate and the acid would react to form $ClO_2$ and the nitrite would then no longer take part in the reaction. Accordingly, it is recommended that the reaction be carried out within a pH range of between about 4 and 9.

EXAMPLE 3

Five grams of calcium chlorate $Ca_2(ClO_3)_2$ and 10 grams of sodium nitrite were dissolved in 100 ml. of water. The aqueous solution thus obtained was passed through an "Ionac" C-257 cation exchange resin in the hydrogen form. The eluate was collected by gravity and analyzed for its contents. It was found that the eluate contained 3.0 grams of chlorous acid, 1.1 grams of calcium chlorate, 0.6 grams of $NaClO_2$ and 7.4 grams of $NaNO_3$. Free chlorine could not be detected in the eluate.

EXAMPLE 4

Five grams of potassium chlorate—$KClO_3$—and 5 grams of sodium nitrite were dissolved in 100 ml. of water. The solution was passed through a cation exchange resin column of the previously indicated kind and the eluate was collected by gravity and analyzed for its contents.

2.9 grams of chlorous acid, 1.2 grams of $KClO_3$ and 0.5 grams of $NaClO_2$ as well as 4.3 grams of $NaNO_3$ were found. No free chlorine could be detected.

In each of these examples chlorine dioxide gas can be expelled from the eluate by heating.

Additional tests indicated that pressure conditions have no apparent effect on either the yield or the reaction time.

EXAMPLE 5

Example 1 was repeated at various temperature conditions. The effect of the temperature is tabulated in the following:

| Temperature, °C. | Percent yield | |
|---|---|---|
|  | High | Low |
| 37 | 52 | 48 |
| 45 | 53 | 49 |
| 55 | 55 | 51 |
| 60 | 63 | 60 |
| 65 | 63 | 60 |
| 70 | 63 | 60 |
| 80 | 63 | 60 |
| 90 | 60 | 60 |

At temperatures in excess of 90° C., the chlorous acid could not properly be retained in the solution but escaped in the form of chlorine dioxide.

The tests performed indicated that the reaction proceeds essentially stoichiometrically and that the molar ratio between chlorate and nitrite in the solution should be 1:1.

The concentration of the aqueous solution is, of course a function of the solubility of the chlorate and nitrite in water. Thus, the concentration is directly proportional to the solubility which in respect to the chlorate is 46 grams per 100 ml. of water at 37° C., yielding approximately 24 grams of chlorous acid if the solution also contains 46 grams of sodium nitrite and sufficient resin is available to effect the desired exchange. The yield effect is not increased by using supersaturated solutions or slurries. The optimum concentration of chlorous acid in the eluate would be approximately 240,000 p.p.m. $ClO_2$. However, at such high concentrations the eluate would be dangerous to handle since it conceivably could explode if not immediately diluted. Experiments have indicated that an eluate containing 120,000 p.p.m. of $ClO_2$ is the highest concentration that can be safely handled.

From the above it will have become apparent that chlorous acid can be readily produced by establishing ion exchange between a cation exchange resin in the hydrogen form and an aqueous solution of an alkali metal or alkaline earth metal chlorate and an alkali metal or alkaline earth metal nitrite. The yield of chlorous acid can be increased if the initially alkaline pH of the aqueous solution is rendered acidic by the addition of a suitable acid. However, pH values below 4 should be avoided.

Further, the yield can be increased by raising the temperature, the most favorable temperature range being between about 37 and 90° C.

Eluates containing 240,000 p.p.m. of $ClO_2$ may be produced by the inventive procedure, but such high concentrations should immediately be diluted for safe handling.

What is claimed is:

1. A process of preparing chlorous acid, which comprises flowing an aqueous solution of
    (a) the chlorate of an alkali metal or alkaline earth metal, and
    (b) the nitrite of an alkali metal or alkaline earth metal through a cation exchange resin, the active sites of which are occupied by hydrogen, and collecting chlorous acid solution as the eluate.

2. A process as claimed in claim 1, wherein the pH value of the aqueous solution is adjusted to about between 4–9.

3. A process as claimed in claim 2, wherein the adjustment of the pH value is carried out by adding an acid to the aqueous solution.

4. A process as claimed in claim 1, wherein the aqueous solution is flowed through said resin at a temperature of about between 37 and 90° C.

5. A process as claimed in claim 1, wherein the molar ratio of chlorate to nitrite in the aqueous solution is 1:1.

6. A process as claimed in claim 1, wherein said eluate is heated, whereby chlorine dioxide is expelled.

References Cited

UNITED STATES PATENTS

| | | | |
|---|---|---|---|
| 2,520,915 | 9/1950 | Cunningham et al. | 423—472 |
| 2,834,649 | 5/1958 | Avedikian | 423—479 |
| 2,866,682 | 12/1958 | Avedikian | 423—479 |
| 3,684,437 | 8/1972 | Callerame | 423—472 |
| 3,695,839 | 10/1972 | Callerame | 423—472 |
| 2,358,866 | 9/1944 | MacMahon | 252—187 R |

FOREIGN PATENTS

| | | | |
|---|---|---|---|
| 791,680 | 3/1958 | Great Britain | 423—473 |
| 826,437 | 1/1952 | Germany | 252—187 R |

OTHER REFERENCES

C. A. Jacobson: "Encyclopedia of Chemical Reactions," 1948 ed., vol. 2, p. 726, Reinhold Pub. Corp., New York, N.Y.

EDWARD STERN, Primary Examiner

U.S. Cl. X.R.

423—395, 479